United States Patent
Ucar

[11] Patent Number: 5,884,254
[45] Date of Patent: Mar. 16, 1999

[54] METHOD AND APPARATUS FOR RESTRICTING MICROPHONE ACCEPTANCE ANGLE

[75] Inventor: Melih Ucar, Col Bosques del Sur, Mexico

[73] Assignee: Sensimetrics Corporation, Somerville, Mass.

[21] Appl. No.: 690,984

[22] Filed: Aug. 19, 1996

Related U.S. Application Data

[60] Provisional application No. 60/001,779, Aug. 2, 1995.

[51] Int. Cl.⁶ .................................................. G10L 3/00
[52] U.S. Cl. ................................. 704/231; 704/236
[58] Field of Search ..................... 395/2.4, 2.55, 395/2.79; 381/81, 92; 704/231, 246, 270, 236, 234

[56] References Cited

U.S. PATENT DOCUMENTS

| | | | |
|---|---|---|---|
| 4,308,425 | 12/1981 | Momose et al. | 381/92 |
| 4,412,097 | 10/1983 | Ishigaki et al. | 381/92 |
| 4,489,442 | 12/1984 | Anderson et al. | 381/81 |
| 4,712,231 | 12/1987 | Julstrom | 379/202 |
| 4,752,961 | 6/1988 | Kahn | 381/92 |
| 4,890,314 | 12/1989 | Judd et al. | 348/14 |
| 5,008,941 | 4/1991 | Sejnoha | 381/43 |
| 5,463,694 | 10/1995 | Bradley et al. | 381/92 |
| 5,483,599 | 1/1996 | Zagorski | 381/68.5 |
| 5,506,908 | 4/1996 | Baumhauer, Jr. et al. | 381/92 |
| 5,657,393 | 8/1997 | Crow | 381/92 |

*Primary Examiner*—Richemond Dorvil
*Attorney, Agent, or Firm*—Hale and Dorr LLP

[57] ABSTRACT

A speech recognition system includes an input subsystem consisting of two or more simple microphones, each with a relatively large acceptance angle. The simple microphones are positioned so that the acceptance angles overlap by a relatively small amount. If signals received by each of the simple microphones exceed predetermined thresholds, then a switch is closed to permit a speech recognition subsystem to receive a signal for processing. An additional simple microphone, with a relatively wide acceptance angle centered on the overlap of the other microphones may be used to receive the signals that are fed to the speech recognition subsystem for processing.

18 Claims, 2 Drawing Sheets

METHOD AND APPARATUS FOR RESTRICTING MICROPHONE ACCEPTANCE ANGLE

This application is related to provisional application number 60/001,779, filed Aug. 2, 1995, which is incorporated herein by reference.

FIELD OF THE INVENTION

This invention relates to the field of speech recognition systems and, more particularly, to systems for limiting the speech signals that will be accepted by the speech recognition system.

BACKGROUND OF THE INVENTION

Speech recognition systems are used in a wide variety of applications, and typically involve an input subsystem (e.g., one or more microphones) for obtaining the speech signals and a speech recognition subsystem, for determining the words that most likely correspond to the signals received. At times, speech recognition systems also include a separate directional subsystem for analyzing the signals received to determine the angle from which a signal originated. The quality of each of these subsystems and the interaction among them helps determine the quality and effectiveness of the speech recognition system.

Frequently, it is desirable to restrict the angle within which a microphone accepts input from a sound source. For example, the speech recognition system may be used to permit an operator to control a machine or other device by issuing spoken commands. In such instances, which are becoming more and more common, it can be important to accept spoken commands only from the operator, and to ignore speech or other sounds emanating from a direction other than that of the operator.

While a directional subsystem can be used to refine the analysis performed by the speech recognition subsystem, it also adds an extra level of cost and complexity. Signals from many angles are still received and analyzed by such microphones so that signals from undesired angles must still be detected and rejected.

Alternatively, a microphone with a narrow acceptance angle could be used. However, the design of such a microphone is complex, and its cost is significantly greater than the cost of a simple microphone. In addition, microphones with a narrow acceptance angle typically are larger than simple microphones, and can be too cumbersome to be useful for many applications in which a narrow acceptance angle is desired but space for the microphone is limited.

The present invention overcomes these and other problems with a system that provides a narrow acceptance angle without the use of complex microphones or a complex directional analysis subsystem, as will be shown in the remainder of the specification, referring to the attached drawings.

SUMMARY OF THE INVENTION

The present invention uses an improved input subsystem in a speech recognition system to limit the angle from which a signal is received. Two or more simple microphones, each with a relatively large acceptance angle, are positioned so that their respective angles of acceptance overlap in the horizontal (or some other) plane by a relatively small amount. The area of overlap will provide the narrow angle in which a signal will be received by the speech recognition system.

The signals received by the microphones are fed to the inputs of signal detectors, each of which outputs a signal if the input exceeds a predetermined threshold value. The signal detector outputs are fed to the inputs of an AND gate. Thus, if each microphone receives a signal that exceeds the threshold value for that microphone, the output of the AND gate will be high.

An additional simple microphone with a relatively wide angle of acceptance is positioned so that its primary axis is directed into the overlap area of the other microphones. Thus, it is most sensitive to sounds from the desired angle of acceptance.

The output of the AND gate is used to control a switch that determines whether signals from this additional microphone, which may temporarily reside in a memory or buffer circuit, are fed to a speech recognition subsystem for processing.

DETAILED DESCRIPTION OF PREFERRED EMBODIMENTS

Figure 1:
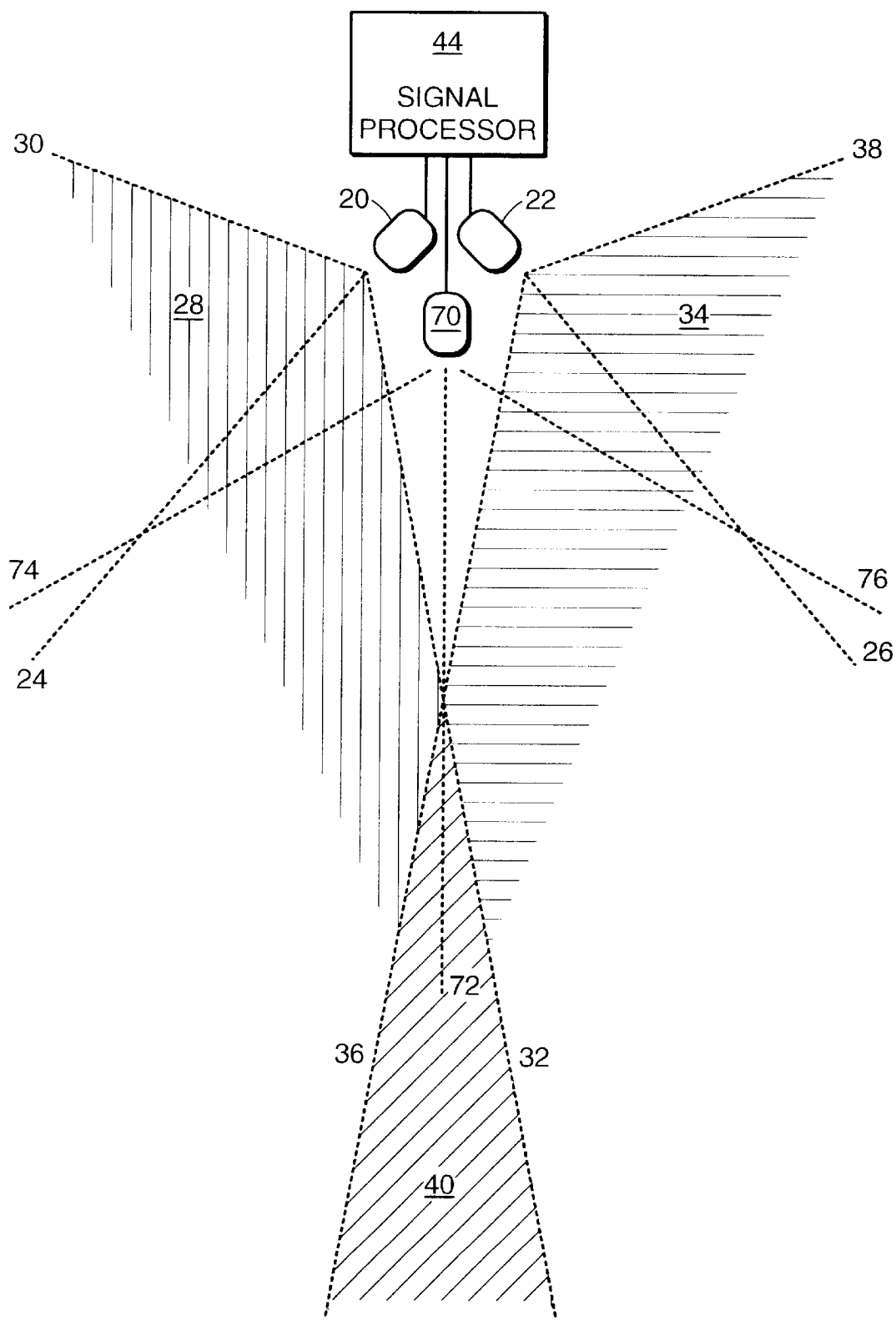
FIG. 1 is a top view of an arrangement of microphones according to the present invention.

As shown in FIG. 1, simple microphones 20 and 22 are positioned adjacent to each other, with their primary axes extending horizontally along dotted lines 24 and 26, respectively. Microphone 20 has an acceptance angle of 120 degrees, as shown by area 28 within lines 30 and 32. Microphone 22 also has an acceptance angle of 120 degrees, as shown by area 34 within lines 36 and 38.

The overlap of the acceptance area 28 of microphone 20 and the acceptance area 34 of microphone 22 is the area 40 between lines 32 and 36. In this case, acceptance area 40 covers 20 degrees.

Figure 2:
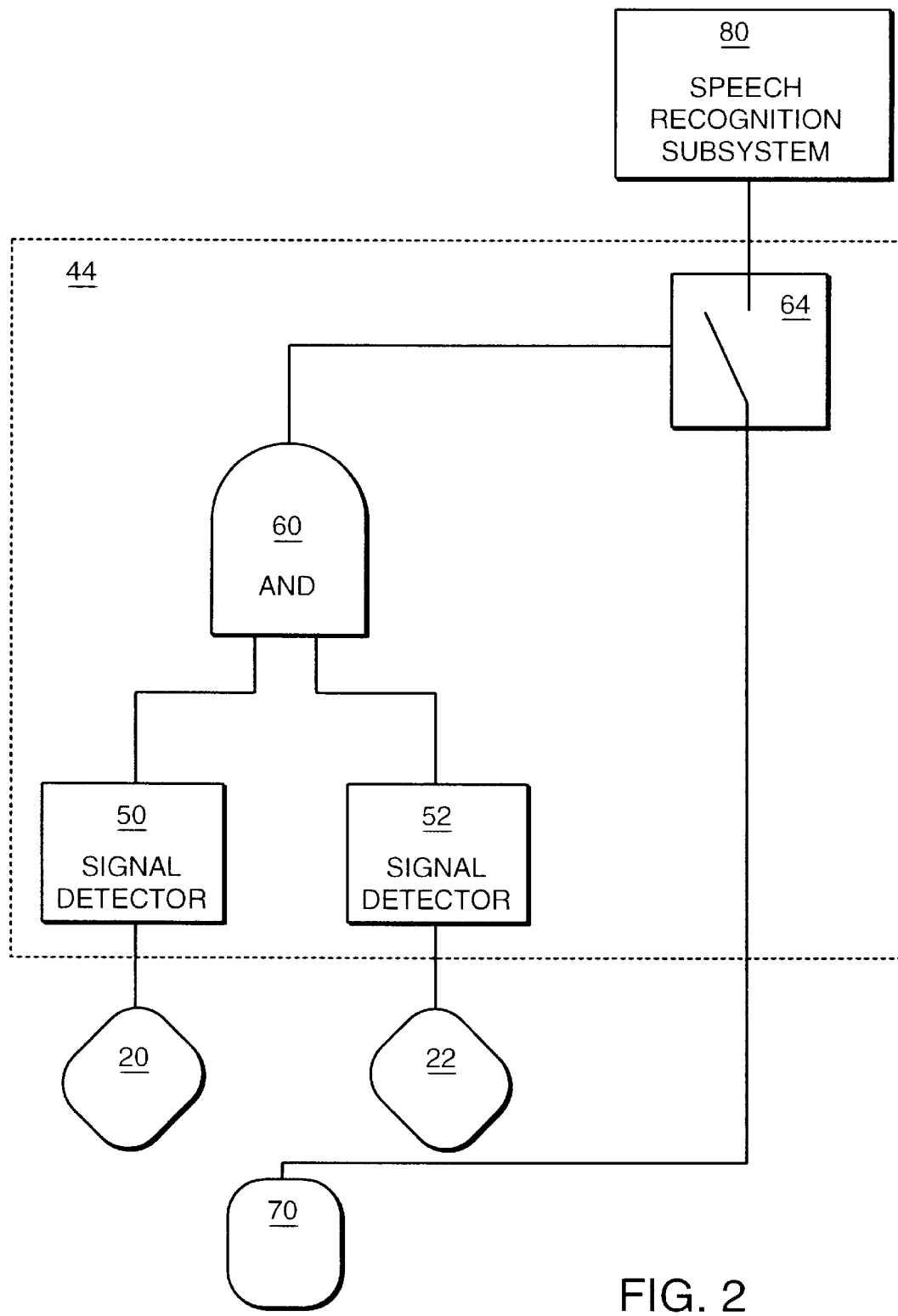
FIG. 2 is a block diagram illustrating one embodiment of the apparatus for restricting acceptance angle of the present invention.

Signals received by microphones 20 and 22 are fed to signal processor 44. As shown in FIG. 2, a signal received by microphone 20 is fed to signal detector 50. Signal detector 50 is set so that it outputs a signal only when the input to signal detector 50 exceeds a desired threshold. Similarly, a signal received by microphone 22 is fed to signal detector 52, which is set so that it outputs a signal only when the input to signal detector 52 exceeds a desired threshold. Preferably, the threshold for signal detector 50 is the same as the threshold for signal detector 52, and a user of the system can adjust the threshold of each signal detector.

The outputs of signal detectors 50 and 52 are fed to AND gate 60. The output of AND gate 60 connects to the control input of switch 64, so that a high output from AND gate 60 closes switch 64 and a low output from AND gate 60 opens switch 64. Preferably, switch 64 is a switching transistor.

Microphone 70 is positioned adjacent to microphones 20 and 22, with its primary axis 72 along the center of system acceptance angle 40, as shown in FIG. 1. Microphone 70 has an acceptance angle of 120 degrees, as shown by lines 74 and 76, which are within the acceptance areas 28 and 34 of microphones 20 and 22, respectively.

The signal received by microphone 70 is input to switch 64 within signal processor 44. The output of switch 64 is fed to conventional speech recognition subsystem 80. Thus, the speech recognition subsystem will receive signals only if they originate within the narrow system acceptance angle 40.

Although the system has been described with two microphones used to establish the system acceptance angle, additional microphones could be used, not necessarily having their primary axes in the same plane. Also, while the system has been described with a third microphone used to provide the input to the speech recognition subsystem, the microphones that set the system acceptance angle could be used alone, or in combination with the third microphone, to provide the input to the speech recognition subsystem.

Additionally, more complicated logic combinations could be utilized. For example, two sets of two microphones and corresponding signal detectors could be used, with each set forming a narrow system acceptance angle, to permit the system to receive signals from two different narrow angles. In this case, the signals from each set would be input to an AND gate, and the outputs of the AND gates would be combined with an OR gate. The output of the OR gate would set the switch for determining when to accept a signal.

Or, the microphones could be positioned so as to accept a signal from a narrow angle as long as there was no signal from a different narrow angle. In this case, the signals from one set of microphones and corresponding signal detectors (establishing the narrow system angle of acceptance) would be input to an AND gate and the signals from a second set of microphones and corresponding signal detectors (establishing the narrow angle for not accepting signals within the angle of acceptance) would be input to a NAND gate. The outputs of the AND gate and the NAND gate would be combined with an AND gate to set the switch for determining when to accept a signal.

More generally, the system and method described can be used in areas other than speech recognition, where a narrow angle of acceptance is desired. For example, infrared motion detectors could be used instead of the microphones, to establish a narrow field for detecting motion. In this application, the output of the AND gate could be used, for example, to turn on a camera or an alarm.

While there have been shown and described examples of the present invention, it will be readily apparent to those skilled in the art that various changes and modifications may be made therein without departing from the scope of the invention as defined by the appended claims. Accordingly, the invention is limited only by the following claims and equivalents thereto.

What is claimed is:

1. A recognition system for a signal source comprising:
   a first microphone having a first acceptance angle;
   a second microphone, positioned adjacent to the first microphone, and having a second acceptance angle, wherein a first portion of the first acceptance angle overlaps a second portion of the second acceptance angle across an overlap angle;
   a first signal detector having an input coupled to an output of the first microphone, wherein the first signal detector provides a first exceeds signal if a signal input to the first signal detector exceeds a first predetermined threshold and the first signal detector provides a first below signal if a signal input to the first signal detector is below the first predetermined threshold;
   a second signal detector having an input coupled to an output of the second microphone, wherein the second signal detector provides a second exceeds signal if a signal input to the second signal detector exceeds a second predetermined threshold and the second signal detector provides a second below signal if a signal input to the second signal detector is below the second predetermined threshold;
   a gate having a first input coupled to the first signal detector, a second input coupled to the second signal detector, and an output, wherein the gate is arranged to provide a first gate signal at the output of the gate or a second gate signal at the output of the gate; and
   a switch coupled to the output of the gate, wherein the switch closes if the output of the gate is the first gate signal and the switch opens if the output of the gate is the second gate signal.

2. The recognition system of claim 1, wherein the output of the gate is the first gate signal if the first signal detector provides the first exceeds signal and the second signal detector provides the second exceeds signal, and the output of the gate is the second gate signal if the first signal detector provides the first below signal or the second signal detector provides the second below signal.

3. The recognition system of claim 2, further comprising a third microphone having a third acceptance angle, wherein the overlap angle is within the third acceptance angle, and wherein an output of the third microphone is coupled to an input of the switch.

4. The recognition system of claim 1, wherein the first microphone is a simple microphone and the second microphone is a simple microphone.

5. The recognition system of claim 1, further comprising a speech recognition subsystem having an input coupled to an output port of the switch.

6. The recognition system of claim 1, further comprising:
   a third microphone having a third microphone acceptance angle;
   a fourth microphone positioned adjacent to the third microphone and having a fourth microphone acceptance angle, wherein a third portion of the third acceptance angle overlaps a fourth portion of the fourth acceptance angle;
   a third signal detector having an input coupled to an output of the third microphone, wherein the third signal detector provides a third exceeds signal if a signal input to the third signal detector exceeds a third predetermined threshold and the third signal detector provides a third below signal if a signal input to the third signal detector is below the third predetermined threshold; and
   a fourth signal detector having an input coupled to an output of the fourth microphone, wherein the fourth signal detector provides a fourth exceeds signal if a signal input to the fourth signal detector exceeds a fourth predetermined threshold and the fourth signal detector provides a fourth below signal if a signal input to the fourth signal detector is below the fourth predetermined threshold;
   wherein the gate further has a third input coupled to the third signal detector and a fourth input coupled to the fourth signal detector.

7. The recognition system of claim 6, wherein the output of the gate is the first gate signal if the first signal detector provides the first exceeds signal and the second signal detector provides the second exceeds signal, or if the third signal detector provides the third exceeds signal and the fourth signal detector provides the fourth exceeds signal.

8. The recognition system of claim 7, wherein the gate includes a first AND gate having a first input coupled to the first signal detector, a second input coupled to the second signal detector, and an output; a second AND gate having a first input coupled to the third signal detector, a second input coupled to the fourth signal detector, and an output; and an OR gate having a first input coupled to the output of the first AND gate, a second input coupled to the output of the second AND gate, and an output coupled to the switch.

9. The recognition system of claim 6, wherein the output of the gate is the first gate signal if the first signal detector provides the first exceeds signal, the second signal detector provides the second exceeds signal, and either the third signal detector provides the third below signal or the fourth signal detector provides the fourth below signal.

10. The recognition system of claim 9, wherein the gate includes a first AND gate having a first input coupled to the first signal detector, a second input coupled to the second signal detector, and an output; a NAND gate having a first input coupled to the third signal detector, a second input coupled to the fourth signal detector, and an output; and a second AND gate having a first input coupled to the output of the first AND gate, a second input coupled to the output of the NAND gate, and an output coupled to the switch.

11. The recognition system of claim 1, further comprising:
 a third microphone positioned adjacent to the first microphone and having a third acceptance angle, wherein a portion of the third acceptance angle overlaps a portion of the overlap angle; and
 a third signal detector having an input coupled to an output of the third microphone, wherein the third signal detector provides a third exceeds signal if a signal input to the third signal detector exceeds a third predetermined threshold and the third signal detector provides a third below signal if a signal input to the third signal detector is below the third predtermined threshold;
 wherein the gate further has a third input coupled to the third signal detector.

12. The recognition system of claim 11, wherein the output of the gate is the first gate signal if the first signal detector provides the first exceeds signal, the second signal detector provides the second exceeds signal, and the third signal detector provides the third exceeds signal.

13. The recognition system of claim 12, wherein the first microphone and the second microphone each have a primary axis in a first plane and the third microphone has a primary axis outside the first plane.

14. The recognition system of claim 1, wherein the first predetermined threshold is adjustable.

15. A method for limiting the acceptance angle of a recognition system for a signal source comprising:
 receiving a signal from within a first acceptance angle;
 receiving a signal from within a second acceptance angle, wherein a first portion of the first acceptance angle overlaps with a second portion of the second acceptance angle across an overlap angle;
 determining whether the signal from within the first acceptance angle exceeds a first predetermined threshold;
 determining whether the signal from within the second acceptance angle exceeds a second predetermined threshold; and
 analyzing a signal from within the overlap angle if the signal from within the first acceptance angle is determined to exceed the first predetermined threshold and if the signal from within the second acceptance angle is determined to exceed the second predetermined threshold.

16. A method as in claim 15, wherein receiving from within a first acceptance angle includes receiving a signal with a first receiver and receiving from within a second acceptance angle include receiving a signal with a second receiver, the method further comprising receiving a signal from within the overlap angle with a third receiver.

17. A method as in claim 15, wherein the analyzing includes analyzing the signal received with the first receiver and analyzing the signal received with the second receiver.

18. A system for detecting the presence of a signal within a prescribed acceptance angle comprising:
 a first receiver having a first acceptance angle;
 a second receiver positioned adjacent to the first receiver and having a second acceptance angle, wherein a first portion of the first acceptance angle overlaps a second portion of the second acceptance angle across the prescribed acceptance angle;
 a first signal detector having an input coupled to an output of the first receiver, wherein the first signal detector provides a first exceeds signal if a signal input to the first signal detector exceeds a first predetermined threshold;
 a second signal detector having an input coupled to an output of the second receiver, wherein the second signal detector provides a second exceeds signal if a signal input to the second signal detector exceeds a second predetermined threshold; and
 a gate having a first input coupled to the first signal detector, a second input coupled to the second signal detector, and an output, wherein the output of the gate is a first gate signal if the first signal detector provides the first exceeds signal and the second signal detector provides the second exceeds signal, and the output of the gate is a second gate signal if the first signal detector provides the first below signal or the second signal detector provides the second below signal.

* * * * *